United States Patent
De Meringo et al.

(10) Patent No.: US 6,313,050 B1
(45) Date of Patent: *Nov. 6, 2001

(54) MINERAL WOOL COMPOSITION

(75) Inventors: Alain De Meringo, Paris; Jean-Luc Bernard, Clermont; Fabrice Laffon, Paris, all of (FR)

(73) Assignee: Isover Saint Gobain (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/446,906
(22) PCT Filed: May 4, 1999
(86) PCT No.: PCT/FR99/01055
 § 371 Date: Mar. 23, 2000
 § 102(e) Date: Mar. 23, 2000
(87) PCT Pub. No.: WO99/57073
 PCT Pub. Date: Nov. 11, 1999

(30) Foreign Application Priority Data

May 6, 1998 (FR) ...................................... 98 05708

(51) Int. Cl.[7] .................................................. C03C 13/06
(52) U.S. Cl. ................................. 501/36; 65/455
(58) Field of Search .......................... 501/35, 36; 65/455

(56) References Cited

U.S. PATENT DOCUMENTS

| | | | |
|---|---|---|---|
| 4,461,840 | * 7/1984 | Massol et al. | ........................ 501/35 |
| 5,108,957 | 4/1992 | Cohen et al. | . |
| 5,131,935 | 7/1992 | Debouzie et al. | . |
| 5,250,488 | * 10/1993 | Thelohan et al. | ........................ 501/36 |
| 5,932,500 | * 8/1999 | Jensen et al. | ........................ 501/36 |
| 5,935,886 | * 8/1999 | Jensen et al. | ........................ 501/36 |
| 5,962,354 | * 10/1999 | Fyles et al. | ........................ 501/36 |
| 6,037,284 | 3/2000 | Holstein et al. | . |
| 6,043,170 | * 3/2000 | Steinkopf et al. | ........................ 501/36 |

FOREIGN PATENT DOCUMENTS

| | | | |
|---|---|---|---|
| 1026928 | * 3/1958 | (DE) | . |
| 29709025 | * 5/1997 | (DE) | . |
| 0459897 | * 12/1991 | (EP) | . |
| 2690438 | * 10/1993 | (FR) | . |
| 2220654 | * 1/1990 | (GB) | . |
| 9614274 | * 5/1996 | (WO) | . |
| 9614454 | * 5/1996 | (WO) | . |
| 97/30002 | * 8/1997 | (WO) | . |

* cited by examiner

*Primary Examiner*—Karl Group

(57) ABSTRACT

The subject of the invention is a mineral wool capable of being dissolved in a physiological medium and comprising the constituents below in the following percentages by weight:

| | |
|---|---|
| $SiO_2$ | 38–52% |
| $Al_2O_3$ | 16–23% |
| RO (CaO + MgO) | 4–15% |
| $R_2O$ ($Na_2O$ + $K_2O$) | 16–25% |
| $B_2O_3$ | 0–10% |
| $Fe_2O_3$ (total iron) | 0–3%, preferably 0–1.5% |
| $P_2O_5$ | 0–3%, preferably 0–1.5% |
| $TiO_2$ | 0–2%. |

17 Claims, No Drawings

MINERAL WOOL COMPOSITION

The present invention relates to the field of artificial mineral wool. It is aimed more particularly at mineral wool intended for manufacturing thermal and/or acoustic insulation materials or soilless-culture substrates.

It concerns more particularly mineral wool of the glass wool type.

This type of mineral wool is usually fiberized by so-called "internal" centrifuging processes, i.e. those using centrifugers rotating at high speed and filled with holes. They are in fact well suited to fiberizing mineral wool of the glass wool type, broadly having a composition relatively rich in alkaline metal oxides and having a lower liquidus temperature and a higher viscosity at the fiberizing temperature than rock wool or basalt wool. This type of process is described in particular in Patents EP-0 189 354 or EP-0 519 797.

To the known criteria of industrial and economic feasibility and of quality level have in recent years been added that of biodegradability of mineral wool, namely its ability to be rapidly dissolved in a physiological medium, so as to prevent any potential pathogenic risk associated with the possible accumulation of the finest fibres in the body by inhalation.

The object of the invention is therefore to improve the chemical composition of mineral wool, especially of the glass wool type, the improvement being aimed especially at increasing its biodegradability and/or at reconciling biodegradability with ability to be fiberized by internal centrifuging (without, however, excluding other fiberizing methods).

The subject of the invention is a mineral wool capable of being dissolved in a physiological medium, which comprises the constituents below in the following percentages by weight:

| | |
|---|---|
| $SiO_2$ | 38–52%, preferably at least 40%, especially 41–48% or 45–50% |
| $Al_2O_3$ | 16–23%, preferably 17–21% or 17–20% |
| RO (CaO and/or MgO) | 4–15%, preferably 5–12% or 5–11% |
| $R_2O$ ($Na_2O$ and/or $K_2O$) | 16–25%, preferably 17–22% or 17 20% |
| $B_2O_3$ | 0–10%, especially at least 1%, preferably 3–9% or 4–10% |
| $P_2O_5$ | 0–3%, preferably 0–1.5%, especially 0 or greater than 0 and at most 0.5% |
| $Fe_2O_3$ (total iron) | 0–3%, preferably 0–1.5%, especially about 0.01 to 1% |
| $TiO_2$ | 0–2% |

(Throughout the rest of the text, any percentage of a constituent of the composition should be understood to mean a percentage by weight).

The selection of such a composition has allowed a whole graph of advantages to be built up, especially by varying the many complex roles that a number of its specific constituents play.

Thus, what is involved is a mineral wool composition of the glass-wool type, in which its content of alkali metal oxides ($R_2O$) essentially in the form of $Na_2O$ and/or $K_2O$ is greater than its content of alkaline-earth metal oxides (RO), which is essentially in the form of CaO and/or MgO. The content of iron oxide (measured in the form of $Fe_2O_3$, but corresponding, by convention, to the total iron content) is very moderate or even zero; on the other hand, the boron oxide content is significant.

The viscosity at fiberizing of such a composition is suitable for internal centrifuging.

As regards biodegradability, it was already known that certain compounds such as $P_2O_5$, could considerably improve this in mineral compositions especially of the glass-wool type, while other oxides, such as alumina, seemed, on the contrary, to have a tendency to reduce it, at the very least in neutral pH. Reference may be made, for example, to Patent EP-412 878. However, a massive addition of $P_2O_5$ (or, for example, the omission of alumina) has not proved in the context of the invention to be the most judicious approach. This is because other considerations may arise, for example economic ones ($P_2O_5$ coming from expensive raw materials) and also technical ones—the changes in the proportions of $P_2O_5$, and especially of alumina, in the composition may cause other of its properties to vary in an undesirable or unknown manner. Thus, $P_2O_5$ is not without influence on the viscosity of the composition, just like alumina. However, most particularly in the case of compositions of the glass-wool type to be fiberized by internal centrifuging, to which the invention applies most advantageously, the viscosimetric behaviour of the composition is an important criterion to be suitably controlled.

The invention has therefore established a judicious compromise in the following manner: the composition may contain $P_2O_5$, but in a moderate amount of at most 3 or 1.5%. Thus, its beneficial effect on biodegradability is retained, without excessive addition which is expensive and tends to increase the liquidus temperature of the composition.

By suitably adjusting the contents of the other main constituents of the composition, namely RO, $R_2O$, $B_2O_3$ and $SiO_2$, the $Al_2O_3$ content has, on the other hand, been significantly increased, this being at least 16 to 17%. The alumina content may thus advantageously be at least 18%, especially at least 19 or at least 20%.

It has been found that this combination allowed the biosolubility criteria, both measured in vitro tests in neutral pH and in in vitro tests in acid pH, to be satisfactorily met. Indeed, the matter of knowing which pH is most representative of the in vivo physiological medium, especially that of pulmonary regions, has not been definitively resolved. A high alumina content seemed up to now to be favourable to rapid dissolution in acid pH, but slight/slow dissolution in neutral pH.

The invention makes it possible to obtain a high level of biosolubility, at least measured in vitro, whatever the pH, by selecting a high alumina content, but by adapting the content, especially of RO, $R_2O$ and $B_2O_3$, so as to maintain its beneficial effect in acid pH without being made to suffer in neutral pH.

The preferred CaO content of the composition according to the invention is advantageously chosen between 4 and 11%.

In parallel, the preferred MgO content is chosen between 0.1 and 7%, especially between 0.3 and 6.5%.

In fact, it is usual to choose a CaO content which is higher than the MgO content, for a given total content of alkaline-earth metal oxides, especially for raw material cost reasons. The MgO content may thus be chosen to be very low or even zero (for example between 0 and 1%) or to be higher, for example between 2 and 6%.

According to a first embodiment, the CaO/MgO ratio may thus be $\geq 1.25$ especially $\geq 5$ and even $\geq 10$.

However, it has proved useful, in the context of the invention, to propose a second embodiment consisting in providing MgO contents comparable or even greater than CaO contents. MgO/CaO ratios may thus be greater than $\geq 0.8$ or even greater than or equal to 1 or 1.05: this ratio which is different in the respective CaO and MgO contents, could have a favourable impact on the biodegradability of the composition.

The $Na_2O$ content of the composition is at least 12%, especially between 13 et 19.5%, while the preferred $K_2O$ content is at least 0.5%, especially between 0.5 and 8%.

As in the case of the CaO and MgO contents of alkaline-earth metal oxides, in the case of alkali metal oxides the composition usually has a markedly higher $Na_2O$ than $K_2O$ content. For a given total content of alkali metal oxides, $K_2O$ may thus have a very low or zero content (for example, less than 3%, especially between 0.5 and 2.5%). However, it is possible within the scope of the invention to also provide a significantly higher $K_2O$ content, for example about 5 to 7%, something which, for example, may represent up to more than one quarter or even of more than one third, by weight, of the total sum of the alkali metal oxides in the composition.

Advantageously, the composition contains alkaline-earth and alkali metal oxides in the following proportion: $R_2O/RO > 1.8$ especially between 2 and 4.

It should be noted that the sum $SiO_2 + Al_2O_3$ allows the viscosimetric behaviour of the compositions to be largely controlled: it is preferred for this sum to be at least 60%, especially about 61 to 67%.

As regards the content of iron oxide (s) (total iron), this is optional, as mentioned above. The composition may have a low iron oxide content, added intentionally or as an impurity. Its presence in the composition may have a favourable effect on the fire behaviour of the mineral wool obtained.

Like iron, the presence of $P_2O_5$ in the composition is optional, it being possible for its content to be zero, or up to 0.1%, or at least 0.1% and up to 1.5 or 2%.

Boron oxide is an advantageous optional compound which acts especially as a fluxing agent, similar to the way in which the alkali metal oxides act, and seems to be favourable to the biodegradability of mineral wool. Its presence furthermore tends to improve the thermal insulation properties of the mineral wool, especially by tending to lower its thermal conductivity coefficient in its radiative component.

The composition may furthermore contain a certain number of other minor compounds, generally with a total content of at most 2 to 3% of the composition. These may, for example, be traces of $TiO_2$, MnO, $SO_3$, etc.

The temperature at which the compositions have a viscosity $\eta$ (in poise) such that $\log_\eta = 2.5$, $T_{log2.5}$, and/or the temperature at which it has a viscosity $\eta$ (in poise) such that $\log \eta = 3$, $T_{log3}$, are/is greater than the liquidus temperature, $T_{liq}$; the difference $T_{log2.5} - T_{liq}$ and/or $T_{log\ 3} - T_{liq}$ is preferably at least 10° C., preferably at least 20 or 40° C. This difference defines the "working region" of the compositions of the invention, i.e the temperature range in which they may be fiberized, most particularly by internal centrifuging.

The mineral wools, as mentioned above, have a satisfactory level of biosolubility, whether the measurement method involves a neutral or slightly basic pH, or an acid pH.

The mineral wool according to the invention thus generally has a rate of dissolution of at least 30, or at least 40 or 50 ng/cm² per hour measured at pH 4.5 and a rate of dissolution of at least 30 and especially at least 40 or 50 ng/cm² per hour measured at pH 7.5.

In general, such mineral wool also has a rate of dissolution of at least 30 and especially at least 40 or 50 ng/cm² per hour measured at the pH 4.5 and a rate of dissolution of at least 30 and especially at least 40 or 50 ng/cm² per hour measured at pH 6.9.

Generally, it also has a rate of dissolution of at least 60 and especially at least 80 ng/cm² per hour measured at pH 4.5 and/or a rate of dissolution of at least 40 and especially at least 60 ng/cm² per hour measured at pH 6.9 or 7.5.

The mineral wool is mainly used to manufacture thermal and/or acoustic insulation products or soilless-culture substrates. The subject of the invention is also any product comprising, at least partly, such mineral wool defined above.

Further details and advantageous characteristics will emerge from the description below of preferred non-limiting embodiments.

Table 1 below gives the chemical compositions, in percentages by weight, of nine examples.

Table 2 gives three other examples in which the accuracy of the chemical analysis is slightly greater and in which three physical characteristics also appear, namely the liquidus temperature ($T_{liq}$), the temperature ($T_{log3}$) at which the viscosity $\eta$ expressed in poise is such that $\log \eta = 3$ and the temperature ($T_{log2.5}$) at which the viscosity $\eta$ expressed in poise is such that $\log \eta = 2.5$, the three temperatures being expressed in °C.

When the sum of all the contents of all the compounds is slightly less than or greater than 100%, it should be understood that the difference from 100% corresponds to minor impurities/components which are not always analyzed or cannot be analyzed in the trace state ($TiO_2$, $SO_3$) and/or is due only to the approximation, accepted in this field, in the analytical methods used.

TABLE 1

|  | EX. 1 | EX. 2 | EX. 3 | EX. 4 | EX. 5 | EX. 6 | EX. 7 | EX. 8 | EX. 9 |
|---|---|---|---|---|---|---|---|---|---|
| $SiO_2$ | 46.3 | 41.5 | 41 | 46 | 48.1 | 44.6 | 46.5 | 49.94 | 51.3 |
| $Al_2O_3$ | 19.9 | 19.6 | 20.1 | 18 | 16.9 | 19.5 | 17.6 | 17.3 | 16.5 |
| CaO | 5.1 | 10.1 | 7.9 | 5.8 | 4 | 8 | 5.9 | 5.1 | 5.2 |
| MgO | 0.5 | 0.3 | 3 | 6.1 | 6.1 | 2.3 | 4.4 | 2.2 | 3 |
| $Na_2O$ | 19.4 | 19.0 | 13.8 | 17 | 13 | 13.6 | 16.7 | 13.7 | 12.7 |
| $K_2O$ | 0.5 | 0.5 | 7.2 | 5 | 6 | 6.5 | 5.9 | 6.6 | 4.4 |
| $B_2O_3$ | 8.3 | 9 | 6 | 1.2 | 3.5 | 5 | 1.6 | 5.1 | 3.4 |
| $Fe_2O_3$ | — | — | 0.9 | 1 | 1.5 | 0.6 | 1.4 | 0.6 | 2.0 |
| $P_2O_5$ | — | — | — | — | 1 | 0.0 | 0.0 | 0.0 | 1.6 |
| Total | 100 | 100 | 99.9 | 100.1 | 100.1 | 100.1 | 100 | 100 | 100.1 |
| RO | 5.6 | 10.4 | 10.9 | 11.9 | 10.1 | 10.3 | 10.3 | 7.3 | 8.2 |
| $R_2O$ | 19.9 | 24 | 21 | 22 | 19 | 20.1 | 22.6 | 20.3 | 17.1 |

TABLE 2

|  | EX. 10 | EX. 11 | EX. 12 |
|---|---|---|---|
| $SiO_2$ | 46.35 | 49.38 | 49.64 |
| $Al_2O_3$ | 19.9 | 17.3 | 17.9 |
| CaO | 5.1 | 5.1 | 7.8 |
| MgO | 0.04 | 2.2 | 2.7 |
| $Na_2O$ | 19.4 | 13.7 | 16.6 |
| $K_2O$ | 0.01 | 6.6 | 1.15 |
| $B_2O_3$ | 8.95 | 5.05 | 4.15 |
| $Fe_2O_3$ | 0.02 | 0.6 | 0.01 |
| $P_2O_5$ | 0 | 0.04 | 0.01 |
| $TiO_2$ | — | — | 0.02 |
| $SO_3$ | — | 0.03 | 0.01 |
| Total | 99.77 | 100 | 99.99 |
| RO | 5.14 | 7.3 | 10.5 |
| $R_2O$ | 19.41 | 20.3 | 17.75 |
| $T_{liq}$ | 970 | 970 | 1050 |
| $T_{log3}$ | 1072 | 1166 | 1139 |
| $T_{log2.5}$ | 1183 | 1274 | 1242 |

The compositions are fiberized by internal centrifuging in a known manner, especially according to the teaching of the aforementioned patents.

Their working ranges, defined by the difference $T_{log2.5} - T_{liq}$, are amply positive.

Their biodegradability, especially measured at neutral or slightly acid pH (pH 4.9 or 7.5), or at acid pH (4.5) is satisfactory.

Examples 1 and 2 relate to a first embodiment of the invention, in which the greatly predominant oxide from the family of alkaline-earth metals is CaO and the greatly predominant oxide from the family of alkali metals is $Na_2O$.

Examples 3 to 9 relate to a second embodiment, in which, in contrast, the MgO content, from the family of alkaline-earth metals, and the $K_2O$ content from the family of alkali metals, respectively, are not insignificant.

Examples 10 to 12, whose characteristics are specified more accurately, show that the compositions in question exhibit good characteristics for melting them ($T_{liq}$ values not too high) and a working range wide enough for them to be processed by fiberizing without excessive difficulty.

What is claimed is:

1. A mineral wool capable of being dissolved in a physiological medium, the mineral wool comprising the constituents below in the following percentages by weight:

| | |
|---|---|
| $SiO_2$ | 38–52% |
| $Al_2O_3$ | 16–23% |
| RO (CaO + MgO) | 4–15% |
| $R_2O$ ($Na_2O + K_2O$) | 16–25% |
| $B_2O_3$ | 0–10% |
| $Fe_2O_3$ (total iron) | 0–3%, |
| $P_2O_5$ | 0–3%, and |
| $TiO_2$ | 0–2%. |

2. The mineral wool according to claim 1, wherein the mineral wool contains between 4 and 11% of CaO.

3. The mineral wool according to claim 1, wherein the mineral wool contains between 0.1 and 7% of MgO.

4. The mineral wool according to claim 1, wherein the mineral wool satisfies the relationship:

MgO/CaO ≧0.8.

5. The mineral wool according to claim 1, wherein the mineral wool satisfies the relationship:

CaO/MgO ≧1.25.

6. The mineral wool according to claim 1, wherein the mineral wool contains at least 12% of $Na_2O$.

7. The mineral wool according to claim 1, wherein the mineral wool contains at least 0.5% of $K_2O$.

8. The mineral wool according to claim 1, wherein the mineral wool satisfies the relationship:

$R_2O$/RO>1.8.

9. The mineral wool according to claim 1, wherein the mineral wool contains:

$SiO_2+Al_2O_3$: at least 60%.

10. The mineral wool according to claim 1, wherein at least one of ($T_{log2.5}-T_{liq}$) and ($T_{log3}-T_{liq}$) is at least 10° C.

11. The mineral wool according to claim 1, wherein the mineral wool has a rate of dissolution of at least 30 ng/cm² per hour measured at pH 4.5, and a rate of dissolution of at least 30 ng/cm² per hour measured at pH 7.5.

12. The mineral wool according to claim 1, wherein the mineral wool has a rate of dissolution of at least 30 ng/cm² per hour measured at pH 4.5, and a rate of dissolution of at least 30 ng/cm² per hour measured at pH 6.9.

13. The mineral wool according to claim 1, wherein the mineral wool has at least one of a rate of dissolution of at least 60 ng/cm² per hour measured at pH 4.5, a rate of dissolution of at least 40 ng/cm² per hour measured at pH 7.5, and a rate of dissolution of at least 40 ng/cm² per hour measured at pH 6.9.

14. The mineral wool according to claim 1, wherein the mineral wool is produced by a process comprising internal centrifuging.

15. Thermal insulation product, acoustic insulation product or soilless-culture substrate comprising, at least in part, the mineral wool of claim 1.

16. A method of making a mineral wool, the method comprising fiberizing a mineral composition; and forming the mineral wool of claim 1.

17. The method according to claim 16, wherein the fiberizing comprises internal centrifuging.

* * * * *

UNITED STATES PATENT AND TRADEMARK OFFICE
CERTIFICATE OF CORRECTION

PATENT NO.   : 6,313,050 B1
DATED        : November 6, 2001
INVENTOR(S)  : Alain DeMeringo et al.

It is certified that error appears in the above-identified patent and that said Letters Patent is hereby corrected as shown below:

Column 1,
Line 40, "1720%" should read -- 17-20% --.

Signed and Sealed this

Nineteenth Day of November, 2002

Attest:

JAMES E. ROGAN
Attesting Officer        Director of the United States Patent and Trademark Office